US008251540B2

(12) United States Patent
Bauer et al.

(10) Patent No.: US 8,251,540 B2
(45) Date of Patent: Aug. 28, 2012

(54) LAMP FOR SIDE-MARKER, CLEARANCE OR COMBINATION THEREOF

(75) Inventors: Joshua G. Bauer, Ames, IA (US); Patrick Trese, Cicero, IN (US)

(73) Assignee: Innovative Lighting, Inc., Roland, IA (US)

( * ) Notice: Subject to any disclaimer, the term of this patent is extended or adjusted under 35 U.S.C. 154(b) by 572 days.

(21) Appl. No.: 12/434,120

(22) Filed: May 1, 2009

(65) Prior Publication Data

US 2010/0277903 A1 Nov. 4, 2010

(51) Int. Cl.
*F21V 1/00* (2006.01)

(52) U.S. Cl. ........ 362/235; 362/540; 362/305; 362/294; 362/244

(58) Field of Classification Search .................. 362/487, 362/540, 542, 545, 326, 244, 305
See application file for complete search history.

(56) References Cited

U.S. PATENT DOCUMENTS 4,079,442 A 3/1978 Tuerck
4,080,529 A 3/1978 Nagel
5,150,959 A 9/1992 Paffrath et al.
5,325,271 A 6/1994 Hutchisson
5,335,157 A * 8/1994 Lyons .......................... 362/297
5,567,036 A * 10/1996 Theobald et al. ............. 362/485
5,692,827 A 12/1997 Chinniah et al.
5,947,587 A * 9/1999 Keuper et al. ................ 362/235
6,095,663 A 8/2000 Pond et al.
6,220,732 B1 4/2001 Paffrath
6,241,373 B1 6/2001 Kelley et al.
6,623,150 B2 * 9/2003 Roller et al. ................. 362/520
6,905,227 B2 * 6/2005 Wu .............................. 362/240
7,048,419 B1 5/2006 Rodriguez
7,055,996 B2 6/2006 Pond
7,063,440 B2 * 6/2006 Mohacsi et al. .............. 362/240
7,245,203 B2 7/2007 Stephens et al.
7,252,418 B2 8/2007 Enders
2006/0245184 A1 * 11/2006 Galli ............................ 362/208
2007/0041220 A1 * 2/2007 Lynch .......................... 362/646

* cited by examiner

*Primary Examiner* — Ali Alavi
(74) *Attorney, Agent, or Firm* — Davis Brown Law Firm; Kent A. Herink

(57) ABSTRACT

A low profile, streamlined, lamp for use as a side-marker and/or a clearance light on a vehicle which directs a substantial amount of its light output at an angle left and right of the perpendicular axis, and along the longitudinal axis through the agency of an optical element positioned between the light source and the outer cover.

24 Claims, 5 Drawing Sheets

24
22
26
12
18
20
28
16
1

10
1
14
24
3
22
5
14
12

24
14
14
22
28
20
20
10
18
18
16
14
14
12

22
12
1
26
16
28
20
24
18

LAMP FOR SIDE-MARKER, CLEARANCE OR COMBINATION THEREOF

FIELD OF THE INVENTION

The present invention relates to a lamp for indicating by illumination the boundary and or physical characteristics of a vehicle.

BACKGROUND OF THE INVENTION

Lamps used to illuminate moving vehicles have a long history within our technology. The ability to identify the size and type of vehicle is necessary to maintain safety on our roads and highways. The ongoing transition from incandescent light sources to light emitting diode light sources has made such lamps smaller and more power efficient but the limitations set by this new LED technology has not yet been optimized to its fullest extent.

Within the industry of side-marker and clearance lamps there still exists many needs that have yet to be addressed by current technology, chiefly among these needs, is the need to control the light distribution of the LEDs in directions most beneficial to the use of such lamps. Most side-marker and clearance lights to date, direct the majority of their light, generally outward or perpendicular to the side of the base of the lamp. This fact points up the inefficiency of such lights as a vehicle is, even without illumination, most visible when viewed from a perpendicular angle. The need in the industry is to make vehicles more visible when viewing them from an angle to these lamps. Therefore there is a need within the industry for side-marker and clearance lamp that directs more light at a longitudinal angle to the lamp's base.

The first method attempted to meet the need included having the light sources mounted high off the base of the lamp or angled at a slope in relation to the base, but the problems of having a high profile are obvious. Susceptibility to damage, increased drag and vibration made these solutions unacceptable in the market Other technology such as that claimed in U.S. Pat. No. 6,623,150 "Light-emitting diode combination marker/clearance lamp for trucks and trailers" by Roller, et al. has attempted this redirection of light through the use of reflecting or refracting elements integrated into outer lens of the lamp. These have proven effective but introduce several problems such as a high profile prominence and non-streamlined outer surface of the exterior of the lamp that causes increased drag, resonant harmonic noise and vibrations as well as collection points for road dirt and debris that reduce the overall light output. Similar lamps using exterior Fresnel, lenticular, or generally obstructed outer topographies are subject to collections of road dirt to a degree of near total opacity.

Another solution attempted is the use of reflective surfaces partially encasing the LEDs within the lamp to channel the light in the desired direction as is demonstrated in U.S. Pat. No. 6,095,663 "Combination clearance and marker light assembly" by Pond, et al. These too have proven effective but introduce certain problems. The first of which is difficulty in manufacturing, in that fitting metal or plastic reflective chambers around each LED is a non-automated task requiring significant amounts of time and can reduce manufacturing yields and efficiency. The second is over heating due to the lack of heat distribution which is inhibited by the isolation of the reflective surfaces. Increased heat is known to reduced LED's lifespan and therefore the operational duration of any such lamp.

Therefore what is needed is an LED generated light source lamp for use as a side-marker or clearance light that can direct a significant percentage of its light at an angle to the lamp and has the advantages of having a low profile, a streamlined outer lens, and no restrictive or thermally isolative encasement of the light source, which includes an uncomplicated method of manufacturing.

SUMMARY OF THE INVENTION

To meet these needs, the present invention generally provides an LED powered combination side-marker and clearance lamp that significantly redistributed light at an angle to the lamp's base, maintains a low profile, has a streamlined outer lens and maintains even heat distribution and dissipation.

One aspect of the present invention is that the redirection of light is accomplished in a two stage method wherein the light output of the LED is first passed through a first or interim lens that refracts a portion of the light at an angle and then passes through the outer cover of the lamp that may use a refractory inner topography to increase the angle of the light while maintaining a smooth and streamlined exterior.

Another beneficial aspect of the present invention is increased angular output of light while retaining the advantage of being low profile and decreasing drag on the vehicle and encountering less damage from collision and vibration.

Yet another aspect of the present invention would include avoiding problems with excess heat as the LEDs would enjoy a relatively open chamber for heat distribution and dissipation thus extending the life of the LED. Furthermore the interim lens may be constructed from a thermally conductive material that would aid in distributing heat across the entire lamp for easy dissipation though the cover and/or base.

An additional aspect of the present invention is that the interim lens of the present invention would be designed as a drop-in element of the outer lens/cover which would be easily manufactured and integrated into an automated or manual manufacturing process.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in detail sufficient to enable those skilled in the art to practice the invention, and it is to be understood that other embodiments may be utilized and that structural, logical and mechanical changes may be made without departing from the spirit and scope of the present invention. The following detailed description is, therefore, not to be taken in a limiting sense, and the scope of the present invention is defined by the appended claims.

Figure 1:
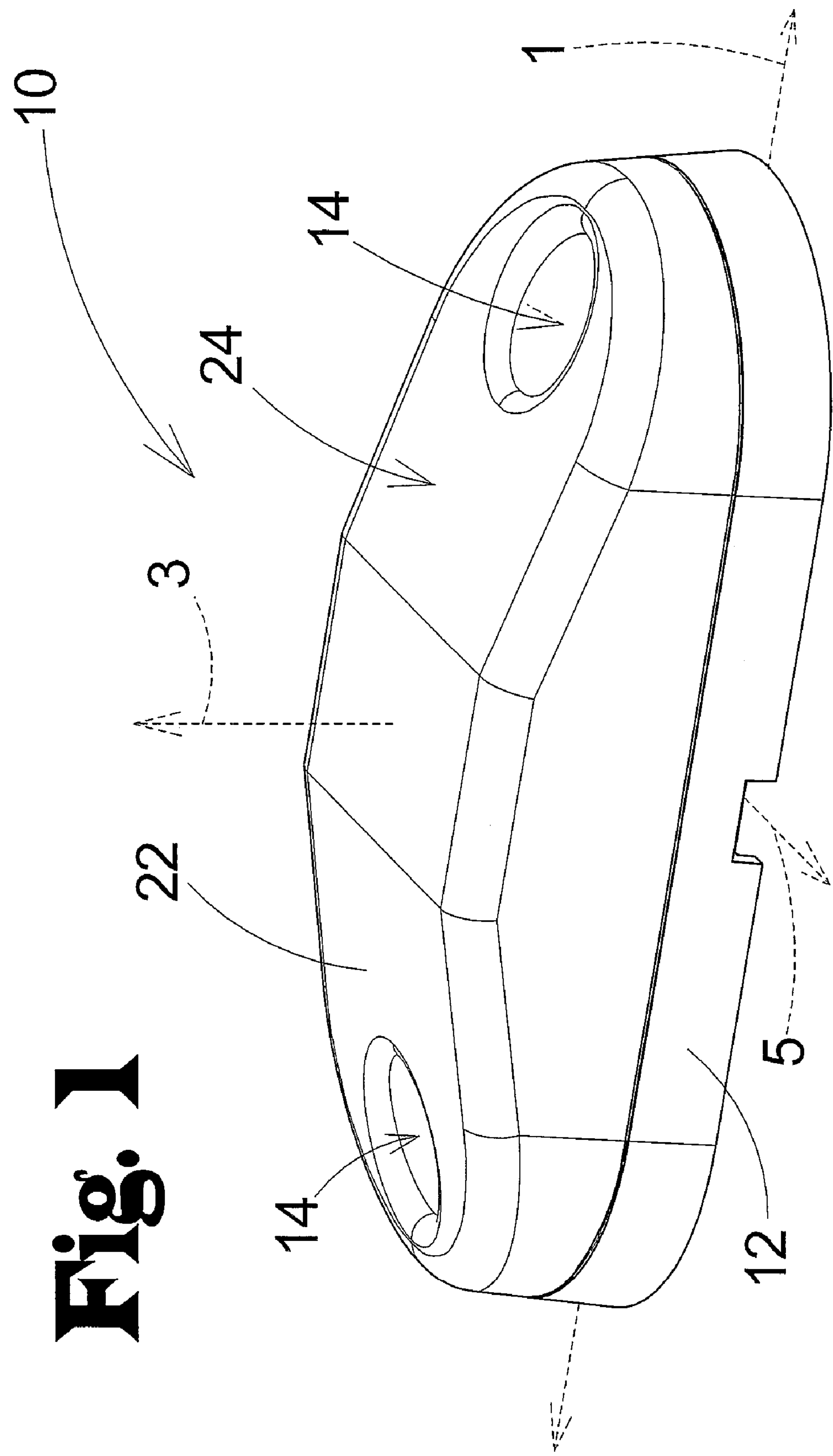
FIG. 1 is a perspective view of an embodiment of the invention.

Illustrated in FIG. 1 is a lamp (10), representing a preferred embodiment of the present invention. The lamp (10) includes a base (12), a light source (22) and a cover exterior (24). The base (12) is adapted to be mounted to a vehicle and is intended to support the constituent elements of the lamp (10). The base (12) may be constructed from of a variety of materials including; metal, ceramic, plastic, carbon composite and others that would be appropriate for the specific characteristics of the vehicle, light source (18), ambient conditions and/or use. The lamp (10) has a longitudinal axis (1) indicated by the axis line (1) and a latitudinal axis indicated by axis line (5). The face of the cover exterior (24) would define the perpendicular axis (3) of the lamp (10) which would be generally at a 90 degree angle to the longitudinal axis (1) and the latitudinal axis (5). The embodiment depicted in FIG. 1 has a comparatively low profile as its height is minimal relative to the necessary space needed for its internal components.

The cover (22) attaches to the base (12) on the side opposite the lamp's (10) attachment to the vehicle. The cover (22) encloses the inner elements of the lamp (10) and protects them from the environment. The cover (22) is constructed from a light transmissive material such as glass or a plastic such as acrylic, or polycarbonate resins such as Lexan® (Sabic Innovative Plastics) and the like. The light transmissive characteristics may span from semi translucent, to totally transparent and may include a range of filters or colors depending on its intended use. The cover exterior (24) is generally uninterrupted and free from obstructions that might cause unwarranted aerodynamic drag or provide a site to collect dirt, dust or road debris. The term streamlined is meant to refer to the characteristics of having an uninterrupted exterior, without protrusion, texture, or contour likely to increase resistance to motion through a fluid, such as air. It is also evident from the use of smooth curves instead of hard angles and the absence of protrusions or projecting structures that the cover's (22) design limits any sort of air resistance that it might encounter and is thus streamlined. This streamlined configuration can also reduce audible noise and/or vibration when mounted to the exterior of a vehicle traveling at high speed. The aerodynamically streamlined contouring is not limited to the cover (22) but may also include the base (12) so that all exterior parts of the lamp (10) would conform to a streamlined shape. As the lamp (10) may be mounted on the front, rear, sides or corners of a vehicle it may be important that the streamlining not be limited to the longitudinal axis (1) but include a smooth flow of air from any possible direction.

The lamp (10) in FIG. 1 also includes a pair of mounting elements (14) which in this embodiment take the form of a pair of through holes in the cover (22) and the base (12) through which mounting screws may be passed to fasten the lamp (10) to the vehicle. It is anticipated that a variety of other mounting elements (14) such as adhesives, latches, hooks, clips, tension mounts, rods, tabs, suction cups, wedges, slots, magnetic attraction could be employed as mounting elements (14) in other embodiments.

Figure 2:
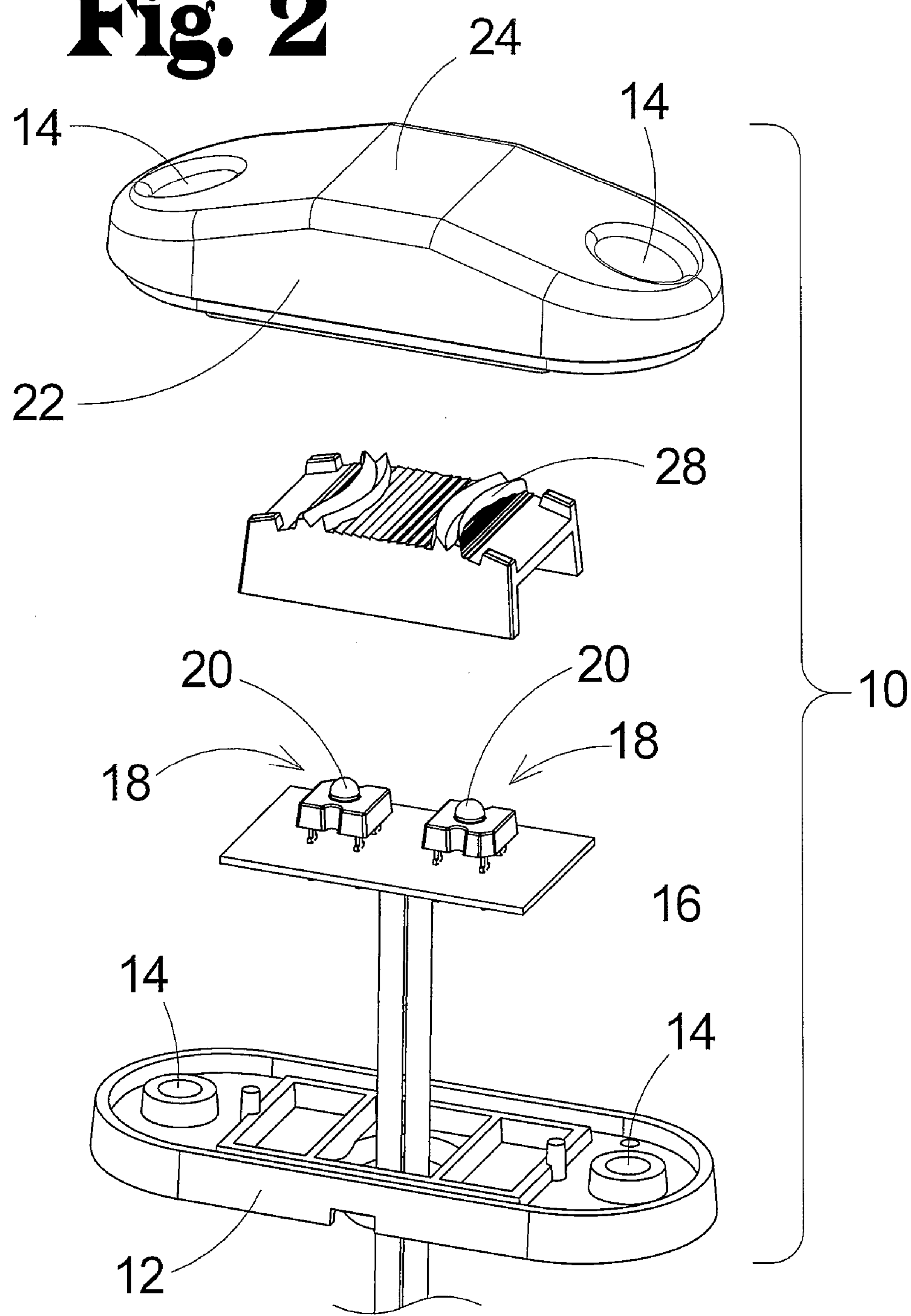
FIG. 2 is an exploded perspective view of an embodiment of the invention.

FIG. 2 is an exploded view of the lamp (10) illustrated in FIG. 1, demonstrating the inner constituent elements. The base (12) includes an area for placing a printed circuit board (16) but is not limited to the mounting scheme demonstrated in the illustration. In other embodiments the printed circuit board (16) may nest inside the outer perimeter of the base (12) or attach by utilizing components of the mounting elements (14). The printed circuit board (16) includes the lamp's (10) light source (18) which in this embodiment consists of a pair of light emitting diodes (20). Other configurations of single or multiple light emitting diodes (20) or other light sources (18) such as incandescent bulbs, fluorescent tubes, electrical arc emitters, and/or radiant contact elements are anticipated.

Positioned between the light source (18) and the cover (22) is the intermediary optical element (28). The purpose of the intermediary optical element (28) is to redirect the light of the light source (18) from its generally perpendicular axis (3) to the desired angles that may cover a range substantially 90 degrees left and right of the longitudinal axis (1) of the lamp (10). The intermediary optical element (28) achieves this effect either with or without the assistance of a second optical element (30) that may be inherent in the cover (22).

The intermediary optical element (28) may accomplish the light distribution through refractory means like a lens or by reflective means like a mirror, or a combination of both methods. A refractory intermediary optical element (28) or lens type optical element may use various lenticular topologies to achieve the desired light distribution. A refectory intermediary optical element (28) or mirrored type optical element would employ apertures and reflective surfaces, similar to a cheese grater to achieve the desired light distribution. The intermediary optical element (28) may be constructed from various materials dependant on it's method of light redirection. Refraction method materials may include glass, transparent plastics or even contained gels or liquids, reflection method materials may include metals, coated plastics, ceramics or glass but the invention is not so limited as other materials may be employed.

Likewise the shape of the intermediary optical element (28) would be dependant on the light directing strategy. The intermediary optical element (28) depicted in FIG. 2 employs a refraction method and includes a topography that refracts the light from the light source (18) in a manner that may cover a range substantially 90 degrees left and right of the longitudinal axis (1) of the lamp (10). The latitudinal sides of the intermediary optical element (28) are designed to fit against the sides of the printed circuit board (16) so that it can be easily assembled within an automated or manual manufacturing process. Elements of the structure of the intermediary optical element (28) designed to engage with or into other interior elements of the lamp (10) are anticipated. For example; the shape of the intermediary optical element (28) may be designed to nest into the cover interior (26) or it may be designed to connect to mounts designed into the base (12).

In a design wherein the intermediary optical element (28) nests within the cover (22), the cover (22) itself may act as the means to keep the intermediary optical element (28) in its proper place, and maintaining proper orientation of the intermediary optical element (28) between the light source (18) and outer cover but other means of maintaining proper placement of the intermediary optical element (28) are anticipated such as connecting the intermediary optical element (28) to the printed circuit board (16), the base (12) or utilizing components of the mounting elements (14).

Figure 3:
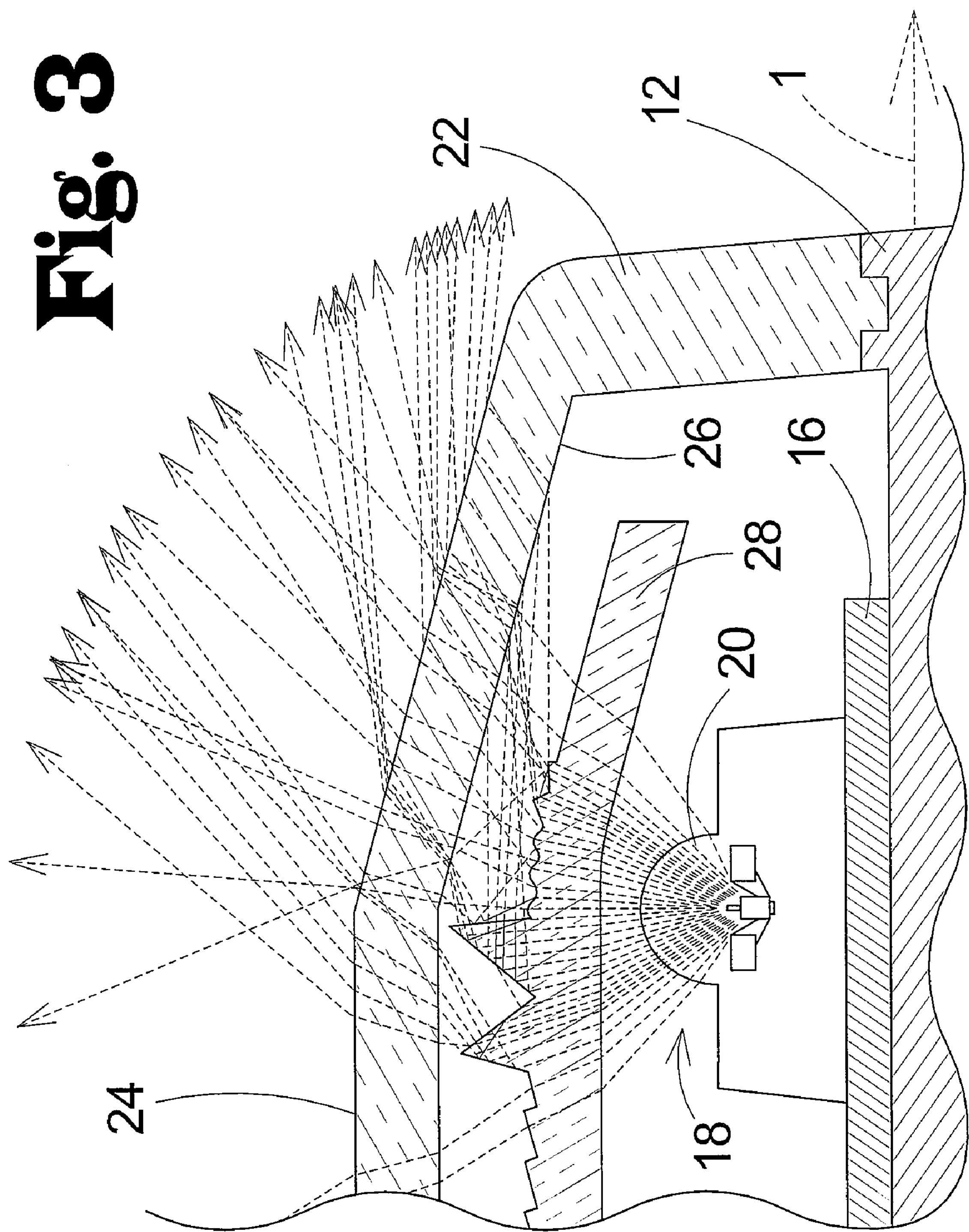
FIG. 3 is a cross sectional view of the interior of an embodiment of the present invention indicating light redirection within an embodiment of the present invention.

FIG. 3 illustrates a portion of a cross sectional view of an embodiment of the lamp (10) showing the redirection of light produced by the light source (18), which initially directs the light in a generally perpendicular direction. When the light passes through the refractory medium of the intermediary optical element (28) a significant portion of the light is redirected towards an angle approaching the 60 degrees to 90 degrees right of the longitudinal axis (1). The light then proceeds on to the cover (22) which in this embodiment has no lenticular topography but in other embodiment may act as a second optical element (30) assisting the intermediary optical element (28) in refracting the light to a greater extent towards an angle approaching the 60 degrees to 90 degrees right of the longitudinal axis (1). It is anticipated that the cover interior (26) may also include a lenticular topography to further enhance or evenly distribute the light as a second optical element (30) at the desired angle to the longitudinal axis (1).

Figure 4:
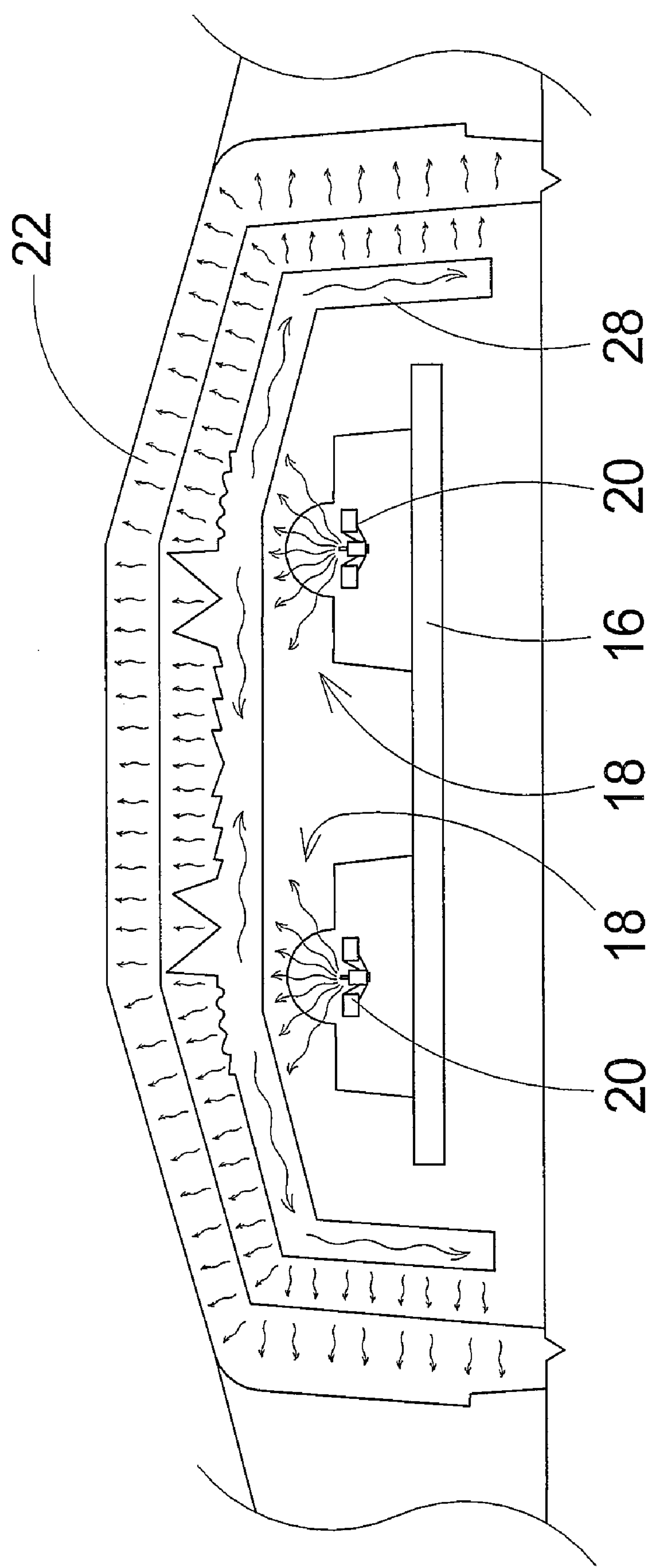
FIG. 4 is a cross sectional view of the interior of an embodiment of the present invention indicating radiant heat transmission within the present invention.

FIG. 4 depicts a cross section of an embodiment of the present invention illustrating heat conduction within the lamp (10). The wavy lines represent direction of heat transmission throughout the lamp (10). Through the agency of the intermediary optical element (28) with high thermal conductivity, such as a metal pass through reflector or a refractive, thermally conductive plastic, the heat is distributed evenly within the interior of the lamp (10) where it can be drawn out through the cover (22) into the surrounding air. This distribution of heat throughout the lamp (10) takes advantage of the entire surface area of the cover exterior (24) to dissipate heat from the light source (18) as opposed to inhibiting heat flow and creating hot spots that may damage the lamp (10) or reduce the service life of the light source (18).

Figure 5A:
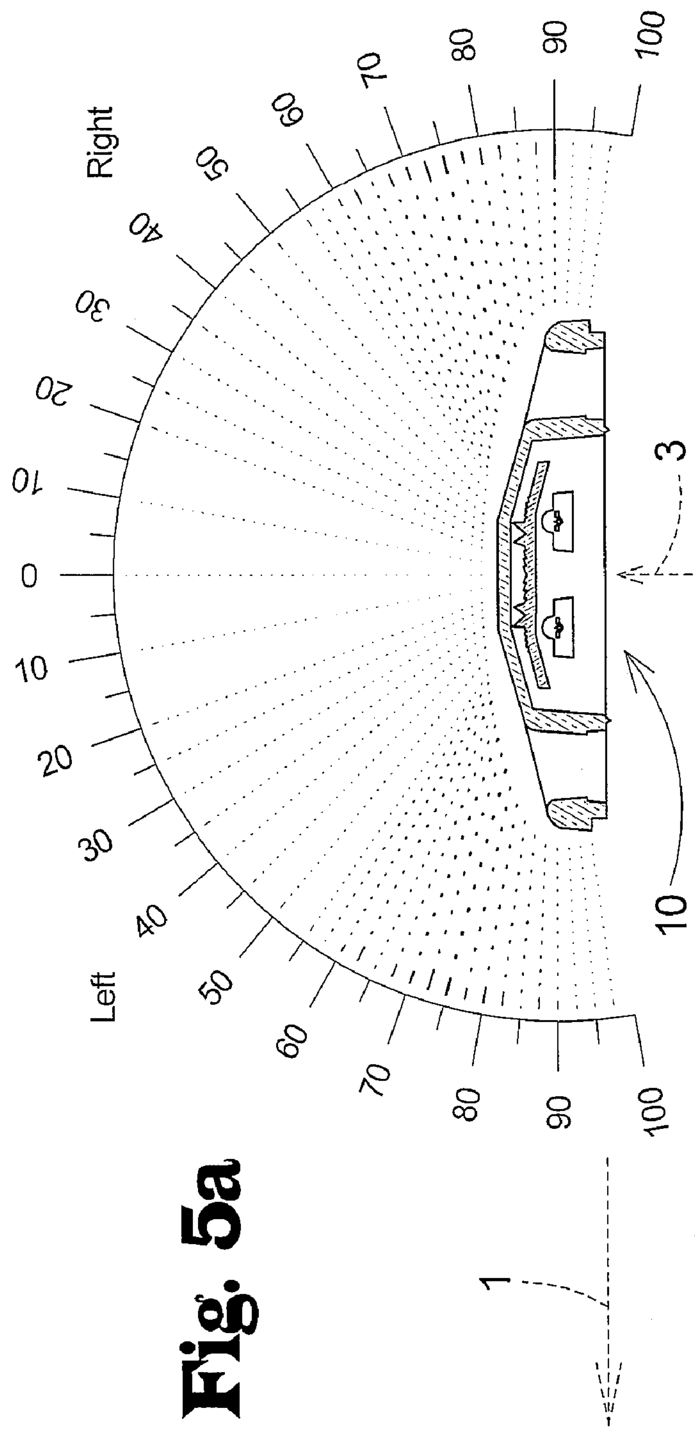
FIG. 5*a* is a cross section of the lamp cut along the longitudinal axis.
Figure 5B:
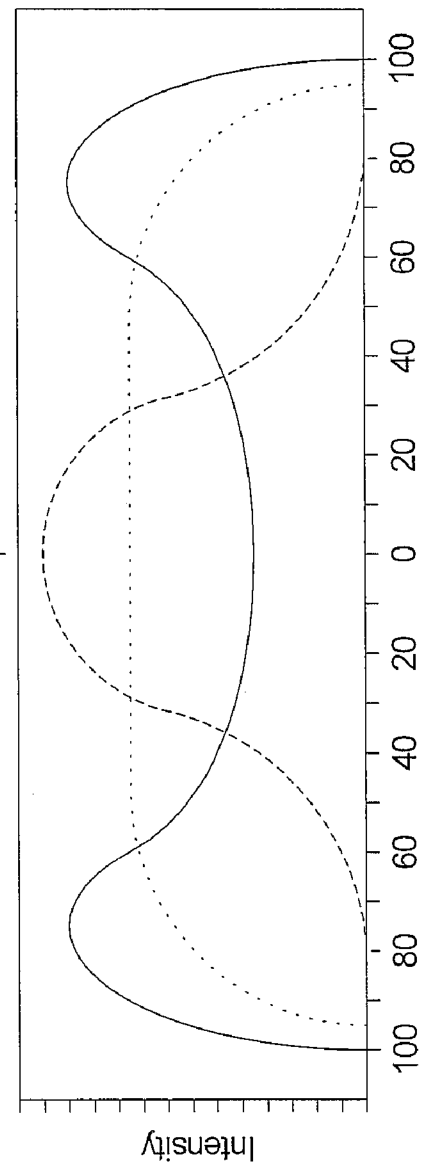
FIG. 5*b* is a graph indicating on the y axis the intensity of the light and on the x axis the angle relative to the longitudinal axis of the lamp.

FIG. 5 represents the desired light distribution pattern substantially 60 degrees to 90 degrees left and right of the longitudinal axis (1) of the lamp (10). FIG. 5*a* is a cross section of the lamp (10) cut along the longitudinal axis (1). The dotted lines represent the light emitted. The frequency and thickness of the dotted lines indicate the intensity of the light being emitted at the angular inclination represented by the outer compass markings. FIG. 5*b* is a graph indicating on the y axis the intensity of the light and on the x axis the angle relative to the longitudinal axis (1) of the lamp (10). The solid graphed line indicates the desired pattern wherein a substantial quantity of the light is being emitted at angles from 60 degrees to 90 degrees left and right of the perpendicular axis (3) of the lamp (10). A lamp (10) with no means for redirecting the light, indicated by the dashed graphed line, shows the most significant amount of light being emitted along the perpendicular axis (3) of the lamp (10). The dotted line indicates a third desired light distribution pattern having an even or consistent intensity from 90 degrees left and right of the perpendicular axis (3) of the lamp (10). This even distribution of light across the entire 180 degree (90 degrees right and left) longitudinal axis (1) of the lamp (10) is a potential light distribution pattern made possible by the present invention. It is anticipated that intermediary optical elements (28) could be designed for any desired light distribution pattern ranging from a slight angular variation from the raw light emitting diode (20) distribution pattern as indicated by the dashed line, to the 60 degrees to 90 degrees left and right of the longitudinal axis (1) of the lamp (10) as indicated by the solid line.

It should be appreciated from the foregoing description and the many variations and options disclosed that, except when mutually exclusive, the features of the various embodiments described herein may be combined with features of other embodiments as desired while remaining within the intended scope of the disclosure.

It is to be understood that the above description is intended to be illustrative, and not restrictive. Many other embodiments and combinations of elements will be apparent to those skilled in the art upon reviewing the above description and accompanying drawings. The scope of the invention should, therefore, be determined with reference to the appended claims, along with the full scope of equivalents to which such claims are entitled.

What is claimed is:

1. A lamp having a perpendicular axis and a longitudinal axis, comprising:

a base comprising a light source and a mounting element;

a cover; and an intermediary optical element generally disposed between said light source and said cover for distributing light emitted from said light source at angles left and right of the perpendicular axis at substantially 60 degrees to 90 degrees and along the longitudinal axis of said lamp.

2. The lamp of claim 1 wherein the base comprises a plurality of light sources.

3. The lamp of claim 1 wherein the light source comprises a light emitting diode.

4. The light source of claim 3 wherein the light emitting diode includes a printed circuit board.

5. The lamp of claim 4 wherein the intermediary optical element disposed between said light source and said cover is substantially held in place by engaging said printed circuit board.

6. The lamp of claim 1 wherein the cover includes a generally uninterrupted exterior.

7. The cover of claim 6 wherein the exterior of the cover is aerodynamically streamlined.

8. The lamp of claim 1 wherein the cover and base form an aerodynamically streamlined shape.

9. The lamp of claim 1 wherein the intermediary optical element utilizes refraction to distribute light emitted from said light source.

10. The lamp of claim 1 wherein the intermediary optical element utilizes reflection to distribute light emitted from said light source.

11. The lamp of claim 1 wherein the intermediary optical element disposed between said light source and said cover comprises a lens.

12. The lamp of claim 1 wherein the intermediary optical element disposed between said light source and said cover is substantially held in place within said cover.

13. The lamp of claim 12 wherein the thermally conductive intermediary optical element assists in distributing heat generated by said light source to the exterior of the cover.

14. The lamp of claim 1 wherein the intermediary optical element disposed between said light source and said cover is substantially held in place by engaging said light source.

15. The lamp of claim 1 wherein the cover conforms to a relatively low profile.

16. The lamp of claim 1 wherein the interior of said cover comprises a second optical element to assist the intermediary optical element for distributing light emitted from said light source.

17. The lamp of claim 1 wherein the intermediary optical element disposed between said light source and said cover is thermally conductive.

18. The lamp of claim 1 wherein the angles left and right of the perpendicular axis are substantially evenly distributed from 90 degrees left to 90 degrees right along the longitudinal axis.

19. The lamp of claim 1 wherein the intermediary optical element disposed between said light source and said cover is substantially held in place by an engagement with said base.

20. A lamp having a perpendicular axis and a longitudinal axis, comprising:

a light source, comprising a light emitting diode including a printed circuit board;

a mounting element comprising a pair of holes to receive mounting screws and having a low profile;

an uninterrupted, streamlined cover; and a thermally conductive intermediary optical element generally disposed between said light source and said cover for distributing light emitted from said light source at angles left and right of the perpendicular axis and along the longitudinal axis of said lamp.

21. The lamp of claim 20 wherein the intermediary optical element utilizes refraction to distribute light emitted from said light source.

22. The lamp of claim 20 wherein the intermediary optical element utilizes reflection to distribute light emitted from said light source.

23. The lamp of claim 20 wherein the angles left and right of the perpendicular axis are substantially 60 degrees to 90 degrees along the longitudinal axis.

24. The lamp of claim 20 wherein the angles left and right of the perpendicular axis are substantially evenly distributed from 90 degrees left to 90 degrees right along the longitudinal axis.

* * * * *